Aug. 2, 1949.  C. K. GRAVLEY  2,477,596
ELECTROMECHANICAL TRANSDUCER DEVICE
Filed Aug. 29, 1947
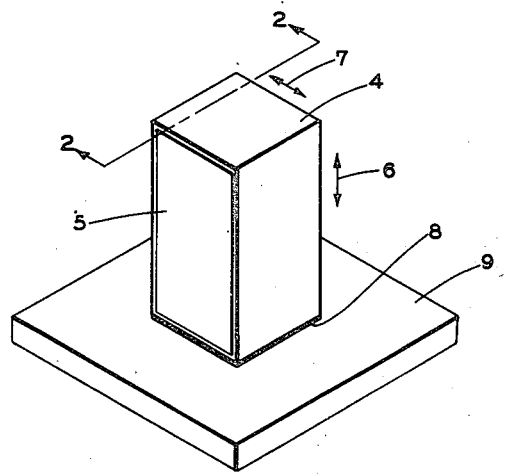
FIG. 1
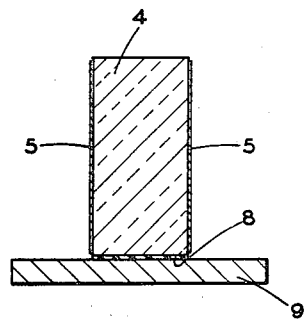
FIG. 2
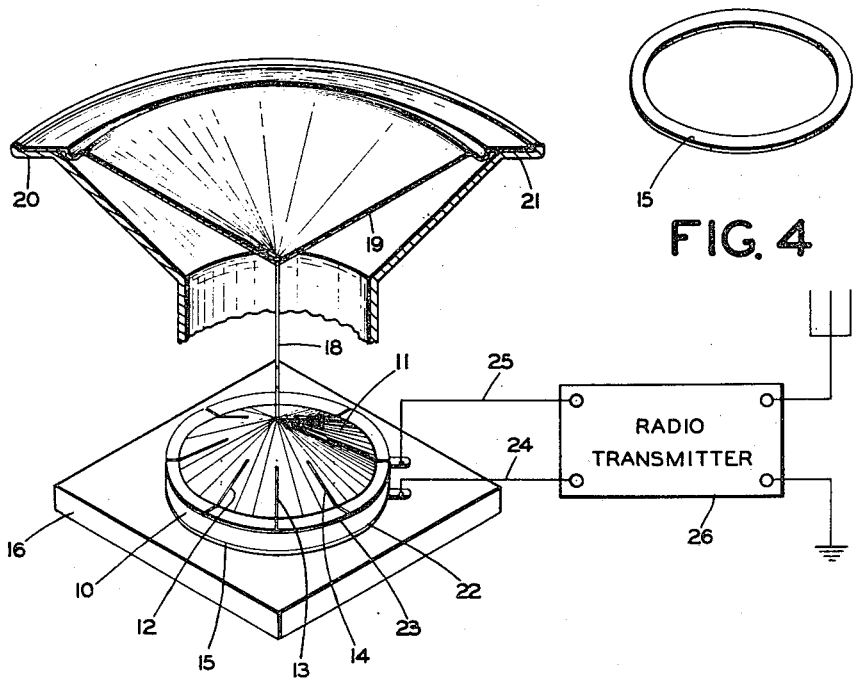
FIG. 3
FIG. 4
INVENTOR.
CHARLES K. GRAVLEY
BY
*Eber J. Hyde*
ATTORNEY Patented Aug. 2, 1949

2,477,596

UNITED STATES PATENT OFFICE 2,477,596

ELECTROMECHANICAL TRANSDUCER DEVICE

Charles K. Gravley, Cleveland Heights, Ohio, assignor to The Brush Development Company, Cleveland, Ohio, a corporation of Ohio Application August 29, 1947, Serial No. 771,198

6 Claims. (Cl. 171—327)

This invention pertains to a new and novel electro-mechanical transducer device, and more particularly to a mounting for a transducer element.

In the past transducer elements such as expander type piezoelectric crystal elements have been rigidly connected to a stiff base member. It is characteristic of some transducer elements that, in addition to a desired direction of vibration, they have another undesired direction of vibration and usually, when the element is positioned on a base, the undesired direction of vibration is parallel to the face of the base. When the element is rigidly secured to the base the undesired vibration is restrained, thereby detrimentally affecting the desired vibration, and often spurious signals are established corresponding to the restrained undesired vibrations. Another disadvantage of rigidly connecting a transducer element to a base arises from the fact that expander transducer elements of a crystalline material, such as primary ammonium phosphate and the like, when properly mounted on a base plate, have two radically different coefficients of thermal expansion which are in mutually perpendicular directions parallel to the base. One of the coefficients of thermal expansion is about six times as great as the other, making it practically impossible to find a base material, other than a block of the same crystalline material, whose thermal coefficient matches that of the crystalline material and leading to the thermal cracking of the crystalline material. Other transducer elements, such as that described and claimed in patent application Serial No. 771,277, filed concurrently herewith in the name of John P. Arndt, Jr., and assigned to the same assignee as the present application, have their direction of desired expansion and contraction in a plane parallel to the plane of the base to which it is connected. It is desired to connect the transducer to the base yet permit the desired motion.

An object of this invention is to provide an improve electro-mechanical transducer device.

Another object of the invention is to provide an electro-mechanical transducer device which is not subject to one or more of the above-mentioned disadvantages.

A further object of the invention is to provide an improved mounting for an electro-mechanical transducer device.

In accordance with the invention an improved electro-mechanical transducer device comprises a transducer element having a planar face with at least one substantial dimension. When it is electrically energized it is adapted to vibrate in a direction which has a substantial component parallel to that substantial direction. There is also provided a stiff base member having a planar face and a layer of material is positioned between, and in engagement with, the planar faces for mounting the element on the base. The layer of material has high shear compliance in the direction of the component and high stiffness in the direction substantially perpendicular to the faces of the element and the base so that the element is closely coupled to the base for relative motion in the direction perpendicular to the planar faces and is much less closely coupled to the base for relative motion in the direction of the component.

For a better understanding of the present invention together with other and further objects thereof, reference is had to the following description taken in conjunction with the accompanying single sheet of drawing, and its scope will be pointed out in the appended claims.

Fig. 1 of the drawing illustrates an electro-mechanical transducer in accordance with the invention; Fig. 2 is a sectional view taken along line 2—2 of Fig. 1; Fig. 3 is an isometric view, partially broken away, showing another form of the invention; and Fig. 4 is an isometric view of a portion of the device shown in Fig. 3.

Referring now to Figs. 1 and 2 there is shown an electro-mechanical transducer device comprising a transducer element in the form of an expander plate 4 of piezo-electric crystalline material such as Rochelle salt, primary ammonium phosphate, or the like, to which are suitably connected electrodes 5, 5, as is well known to the art. The plate of crystalline material is adapted to expand and contract in the desired direction indicated by the double-headed arrow 6 in accordance with an alternating electric signal applied to the electrodes 5, and simultaneously to contract and expand in the undesired direction indicated by the double-headed arrow 7. The transducer effect is reversible as is known to the art; an alternating mechanical force applied to the crystal element 4, preferably in the direction of the arrow 6, results in an alternating electromotive force being generated between the electrodes 5, 5. A stiff base member 9 is provided and a thin layer of compliant material 8 such as gum rubber or the like is positioned between the base 9 and the crystal element 4 and in engagement with the bottom planar face of the crystal element 4 and the top planar face of the base 9. Preferably, though not necessarily, the layer of material 8 is secured by an adhesive to both the crystal element 4 and the base 9.

The layer of material 8 has high shear compliance in the direction of undesired motion of the crystal element (indicated by the arrow 7) so that for those undesired motions the crystal element is substantially decoupled from the stiff base member 9. In the direction of desired motion (arrow 6) the layer of material 8 is stiff, primarily due to the fact that the layer is very thin, so that the crystal element is closely coupled to the base 9.

It is not essential that the undesired vibration of the crystal element take place in a direction parallel to the plane of plate 9 as it may sometimes be desirable to so cut the crystal element from the mother crystal that the direction of the undesired vibration be in a plane at an angle to the plane of the base 9. In such a case the vibration has a substantial component parallel to the plane of the base 9 and the invention is applicable to reduce its undesirable results.

The invention greatly reduces crystal breakage due to wide changes in the temperature of a device embodying the invention. For example: many underwater transducers utilize expander plates of primary ammonium phosphate mounted rigidly by an adhesive to a stiff base plate. A characteristic of primary ammonium phosphate is that, in one direction, its thermal expansion is about six times as much as it is in another direction perpendicular thereto, and in an expander plate, such as that shown in Figs. 1 and 2, those two directions are parallel to the edges of the face which is mounted against the base 9. A transducer embodying such a crystal element is subject to wide and often sudden temperature changes as it may lie on the hot deck of a boat for a while and then be plunged into relatively cool water. The layer of material 8, being compliant in directions parallel to the base 9, prevents large shear forces from being built up in the lower portion of the crystal element with consequent breakage, yet because it is stiff in a direction perpendicular to the base 9 it permits the crystal element to achieve maximum output for vibrations in that direction.

As a specific example, the layer of material 8 may be soft gum rubber approximately .005 inch thick, although the benefits of this invention may be obtained by making the layer somewhat thicker and of somewhat stiffer material as the increased thickness makes up for the increased stiffness. It is not essential that the layer 8 cover the entire area of the bottom of the plate 4, as a hollow frame-like body of the rubber-like material may be used around the outside edge of the transducer element.

In Fig. 3 the electro-mechanical transducer comprises an element 10 in the form of a disk having electro-mechanical transducing properties in the same sense as between mechanical strains in the element in at least two coordinate directions and a resultant electric field in another coordinate direction, and vice versa. The arrangement is described and claimed in the above-mentioned co-pending application. Preferably, the element 10 is comprised of barium titanate material including a substantial portion of strontium and which has been polarized to respond in a linear mode to an alternating field applied thereto.

The transducer of Fig. 3 also comprises an element 11 having spaced points in at least two of the above-mentioned coordinate directions affixed to corresponding points of the element 10 in order to form with the element 10 a two-dimensional bow. Specifically, the element 11, in the arrangement illustrated, comprises a metal cone having its rim affixed to the disk of the titanate material 10 as by cementing or clamping. In order to eliminate some of the stiffness that the cone 10 would otherwise have, a plurality of slits 12, 13 and 14 etc., may be provided in the cone beginning at its rim and extending well in towards the apex of the cone.

The transducer element 10 of Fig. 3 is mounted by means of a thin rubber pad 15 to a solid support 16 which may comprise a portion of the cabinet or container within which the transducer is mounted. For the sake of simplicity, only the small section 16 of the cabinet or support is shown. The element 10 is affixed to the rubber pad 15 by cementing and the pad 15 is in turn cemented to the support 16.

Drive means are affixed to the member 11 at the apex of the cone. As shown, this comprises a drive pin 18 connected to the diaphragm 19 of a microphone, the rim of the diaphragm 19 being affixed to some fixed member such as a part of the structure of the cabinet as indicated at 20, 21.

Alternating current signal-translating means are connected to two opposing faces of the element 10 for translating electrical currents associated with the above-mentioned mechanical strains and electric fields. Specifically this last-named means comprises a metal electrode 22 on the bottom face of the disk 10, and between the disk 10 and the rubber mounting pad 15, and a metal electrode 23 on the upper face of the disk 10. Electrodes 22 and 23, respectively, are connected by conductors 24 and 25 to the input terminals of a radio transmitter 26.

In considering the operation of the transducer 10, reference is made to the fact that a disk of properly polarized titanate material having potentials applied to the face thereof tends to expand or contract, depending upon the polarity of the applied potential, in all radial directions. This property is explained in full in connection with description of Fig. 1 of application for United States Letters Patent Serial No. 740,460, filed April 9, 1947, in the name of Hans Jaffe and assigned to the same assignee as the present application. The property just mentioned is a reciprocal one and radial stresses, applied in the same sense in a number of directions in the disk 10, cause corresponding potentials or components of potentials to be present between electrodes 22 and 23. It is here assumed that the titanate material 10 has been polarized to respond in the linear mode to an alternating field applied thereto. This may be done, for example, by applying thereto a unidirectional polarizing voltage of large magnitude as explained in the above-identified Jaffe application. However, some titanate materials have the property of retaining this polarization even after the above-mentioned unidirectional potential has been removed. Regardless of the manner in which it is done, it will be assumed that the disk 10 has this polarized property. Under the conditions stated, sound waves incident upon the diaphragm 19 cause vibratory movements of the apex of the cone 11 and, due to the stiffness of the metal member 11, these movements apply radial contraction or expansion forces to the material of the titanate disk 10. As a result of these expansion or contraction forces, electrical potentials are developed between the electrodes 22 and 23 which are in turn applied to the input circuit of the radio transmitter 26. These potentials are utilized in the transmitter to modulate the high-frequency signal which is radiated from the antenna of the transmitter in a manner which, per se, is well understood by those skilled in the art.

Fig. 4 shows by an isometric view the hollow ring 15 of thin gum rubber which is positioned between the massive stiff base 16 and the transducer element 10. In the embodiment shown in Fig. 3 it is desired that the ring-shaped transducer element 10 expand and contract with as little force as possible from the base 16 opposing it yet the element 10 should be securely mounted against the base 16. The thin gum rubber ring 15 is ideally suited to fulfill such requirements as it is very compliant in shear and, being very thin, it is stiff in a direction substantially perpendicular to the base 16.

The invention has been described in relation to an electro-mechanical transducer device as it is with such a device that it will achieve its utmost usefulness. This invention, however, is not limited to a device wherein an electro-mechanical transducing function is the primary function as it is also useful to mount a transducer whose primary function is as an electro-optic transducer if that transducer exhibits an electro-mechanical vibration. In such a transducer it is not the electro-mechanical effect which is of primary importance, but a mounting constructed in accordance with this invention will substantially prevent distortion of electro-optic effects due to the mounting mechanically restraining the transducer.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An electro-mechanical transducer device comprising: a transducer element having a planar face with at least one substantial dimension and adapted, when electrically energized, to vibrate in a direction having a substantial component parallel to said dimensions; a solid stiff base member having a planar face; and a layer of material positioned between, and in engagement with, said planar faces for mounting said element on said base and having high shear compliance in the direction of said component and high stiffness in the direction substantially perpendicular to said faces, whereby said element is closely coupled to said base for relative motion in the direction perpendicular to said planar faces and is much less closely coupled to said base for relative motion in the direction of said component.

2. An electro-mechanical transducer device as set forth in claim 1 in which said layer of material comprises a layer of gum rubber about .005 of an inch thick.

3. An electro-mechanical transducer device as set forth in claim 1 in which said transducer element comprises an expander piezoelectric crystal element.

4. An electro-mechanical transducer device as set forth in claim 1 in which said transducer element comprises an expander piezoelectric crystal element and said layer of material comprises a solid layer of gum rubber about .005 of an inch thick.

5. An electro-mechanical transducer device as set forth in claim 4 additionally characterized by adhesive means connecting said layer of gum rubber to said crystal element and to said base.

6. An electro-mechanical transducer device comprising: a transducer element having a planar face with at least one substantial dimension and adapted, when electrically energized, to vibrate in a plurality of directions each having a substantial component parallel to said plane; a solid stiff base member having a planar face; and a layer of material positioned between, and in engagement with, said planar faces for mounting said element on said base and having high shear compliance in the directions of said components and high stiffness in the direction substantially perpendicular to said faces, whereby said element is closely coupled to said base for relative motion in the direction perpendicular to said planar faces and is much less closely coupled to said base for relative motion in the directions of said components.

CHARLES K. GRAVLEY.

REFERENCES CITED

The following references are of record in the file of this patent:

UNITED STATES PATENTS

| Number | Name | Date |
|---|---|---|
| 1,802,781 | Sawyer et al. | Apr. 28, 1931 |